( 12 ) United States Patent
Martino (10) Patent No.: US 10,932,441 B2
(45) Date of Patent: Mar. 2, 2021

(54) WALL MOUNTED STRUCTURE FOR CATS (71) Applicant: Marc Gregory Martino, Westlake Village, CA (US)

(72) Inventor: Marc Gregory Martino, Westlake Village, CA (US)

( * ) Notice: Subject to any disclaimer, the term of this patent is extended or adjusted under 35 U.S.C. 154(b) by 464 days.

(21) Appl. No.: 15/183,109

(22) Filed: Jun. 15, 2016

(65) Prior Publication Data

US 2016/0360724 A1 Dec. 15, 2016

Related U.S. Application Data (60) Provisional application No. 62/175,562, filed on Jun. 15, 2015.

(51) Int. Cl.
*A01K 1/035* (2006.01)
*A01K 15/02* (2006.01)

(52) U.S. Cl.
CPC .............. *A01K 1/035* (2013.01); *A01K 15/02* (2013.01)

(58) Field of Classification Search
CPC .......... A01K 1/03; A01K 1/033; A01K 15/00; A01K 15/02; A01K 15/024; A01K 1/035; A47B 96/027; F25D 2400/036
USPC .................... D30/117, 118; 211/87.01, 90.01
See application file for complete search history.

(56) References Cited

U.S. PATENT DOCUMENTS

| | | | | |
|---|---|---|---|---|
| 2,795,117 A | * | 6/1957 | Herndon, Jr. ......... | F25B 39/024 62/289 |
| 2,981,580 A | * | 4/1961 | Hansen ................ | A47B 77/022 108/27 |
| 3,101,486 A | * | 8/1963 | Tiller ................... | A47B 77/022 108/152 |
| 3,118,250 A | * | 1/1964 | Harvey ................... | A01G 9/00 108/42 |
| 3,437,214 A | * | 4/1969 | Sainsbury ............ | A47B 96/067 108/152 |
| 3,613,604 A | * | 10/1971 | Butler ................... | A47B 96/027 108/12 |
| 4,057,031 A | * | 11/1977 | Williams ............. | A01K 1/0353 119/28.5 |
| 4,074,635 A | * | 2/1978 | Stauble ................ | A47B 96/027 108/152 |
| 4,911,310 A | * | 3/1990 | Raishe .................. | A47J 47/16 211/41.11 |
| 4,998,627 A | * | 3/1991 | Elder ........................ | A47F 5/08 211/41.11 |
| 5,002,012 A | * | 3/1991 | Pierrot ................. | A01K 15/025 119/28.5 |

(Continued)

*Primary Examiner* — Christopher D Hutchens
(74) *Attorney, Agent, or Firm* — Hackler Daghighian Marino & Novak (57) ABSTRACT A wall mounted structure for cats includes a vertically disposed back surface attached directly to a vertical wall and/or a stud or a plurality of studs or attached to the vertical wall and/or the stud or the plurality of studs with a mounting bracket. A horizontally disposed floor forwardly extends from the back surface, wherein the floor is disposed perpendicular to the back surface. At least one horizontally disposed landing pad forwardly extends from the back surface, wherein the at least one landing pad is disposed perpendicular to the back surface, and wherein the at least one landing pad is disposed adjacent to and at a height above the floor. A front surface is attached to the floor and the at least one landing pad.

25 Claims, 9 Drawing Sheets

(56) References Cited

U.S. PATENT DOCUMENTS

| | | | | |
|---|---|---|---|---|
| 5,044,285 A * | 9/1991 | Wolfe, III | | A47B 96/06 108/152 |
| 5,097,969 A * | 3/1992 | Maxworthy | | A47F 5/0846 108/152 |
| 5,165,366 A * | 11/1992 | Harvey | | A01K 1/0107 119/165 |
| 5,191,747 A * | 3/1993 | Tengquist | | A47F 10/02 108/42 |
| 5,261,350 A * | 11/1993 | Vavrek | | A01K 1/0353 119/165 |
| 5,806,692 A * | 9/1998 | Pepper | | A47B 96/027 211/126.16 |
| 5,832,876 A * | 11/1998 | Brown | | A01K 1/035 119/706 |
| 5,875,735 A * | 3/1999 | Bradley | | A01K 15/024 119/706 |
| 6,360,689 B1 * | 3/2002 | Weinert | | A01K 1/033 119/475 |
| D455,239 S * | 4/2002 | McLaughlin | | D30/118 |
| 6,401,663 B1 * | 6/2002 | Meier, Jr. | | A01K 1/03 119/452 |
| 7,614,363 B2 * | 11/2009 | Di Angelo | | A01K 1/033 119/28.5 |
| 7,934,470 B1 * | 5/2011 | Barker | | A01K 1/035 119/28.5 |
| 8,479,926 B1 * | 7/2013 | Blaisdell | | A47J 47/16 211/181.1 |
| 8,826,862 B2 * | 9/2014 | Lee | | A01K 1/035 119/28.5 |
| D724,793 S * | 3/2015 | Hansen | | D30/118 |
| 2004/0195194 A1 * | 10/2004 | Belokin | | A47F 5/0815 211/87.01 |
| 2008/0134430 A1 * | 6/2008 | Kirmon | | A01K 1/035 5/10.1 |
| 2010/0175631 A1 * | 7/2010 | Bennatt | | A01K 1/033 119/472 |
| 2012/0222623 A1 * | 9/2012 | Moore | | A01K 1/033 119/28.5 |
| 2013/0213305 A1 * | 8/2013 | Hermawan | | A01K 1/035 119/28.5 |
| 2018/0098520 A1 * | 4/2018 | Koskey, Jr. | | A01K 1/033 |

* cited by examiner

WALL MOUNTED STRUCTURE FOR CATS

CROSS-REFERENCE TO RELATED APPLICATIONS

This non-provisional application claims priority to provisional application 62/175,562 filed on Jun. 15, 2015, the entire contents of which are fully incorporated herein with this reference.

DESCRIPTION

FIELD OF THE INVENTION

The present invention generally relates to pet toys. More particularly, the present invention relates to wall mounted structures that are designed and configured for cats to play and rest upon.

BACKGROUND OF THE INVENTION

The pet industry is a multi-billion dollar market in the United States alone. Pet owners are always looking to buy products that either improve the health of their pet or the lifestyle of their pet. The present invention fulfills these needs and provides other related advantages.

SUMMARY OF THE INVENTION

An exemplary embodiment of a wall mounted structure for cats includes a vertically disposed back surface attached directly to a vertical wall and/or a stud or a plurality of studs or attached to the vertical wall and/or the stud or the plurality of studs with a mounting bracket. A horizontally disposed floor forwardly extends from the back surface, wherein the floor is disposed perpendicular to the back surface. At least one horizontally disposed landing pad forwardly extends from the back surface, wherein the at least one landing pad is disposed perpendicular to the back surface, and wherein the at least one landing pad is disposed adjacent to and at a height above the floor. A front surface is attached to the floor and the at least one landing pad.

In other exemplary embodiments, a first connecting wall may forwardly extend from the back surface, wherein the first connecting wall is attached to the back surface, the floor, the at least one landing pad and the front surface. A second connecting wall may forwardly extend from the back surface, wherein the second connecting wall is attached to the back surface, the floor and the front surface, wherein the second connecting wall is disposed opposite from the first connecting wall about a center of the wall mounted structure.

The floor may be rectangular shaped. The floor may be at least 150 square inches in area. The at least one landing pad may be rectangular shaped. The at least one landing pad may be at least 30 square inches in area.

The floor may form a bottom of a basin bounded around a floor perimeter by the back surface, the first connecting wall, the front surface and the second connecting wall.

The front surface may be angled away from the back surface and the floor, wherein the front surface forms an obtuse angle with respect to the floor that is over 90 degrees and up to 150 degrees.

The front surface may include an aperture through the front surface, wherein the aperture is open at a top edge of the front surface and wherein aperture is at least 10 inches in aperture area.

The back surface, the floor, the at least one landing pad, the front surface, the first connecting wall and the second connecting wall may be a single and continuous part formed in a molding process. Alternatively, the back surface, the floor, the at least one landing pad, the front surface, the first connecting wall and the second connecting wall may be separate flat parts connected together to form the wall mounted structure.

The at least one landing pad may comprise a textured surface.

A separately formed plush pad or cushion may be designed to fit within the bottom of the basin of the floor.

Each wall mounted structure may be configured to be nestable with regards to another wall mounted structure creating a stacking differential of less than 3 inches.

The at least one landing pad may not be disposed directly above the floor.

The wall mounted structure of claim 10, wherein the back surface is at least 100 square inches in area.

At least one separately formed step may be attachable to the vertical wall and/or the stud or the plurality of studs.

At least one separately formed corner step may be attachable to a corner of the vertical wall.

At least one separately formed vertical gripping surface may be attachable to the vertical wall and/or the stud or the plurality of studs, wherein the vertical gripping surface comprises a carpet or plush surface climbable by the cats.

Another exemplary embodiment of a wall mounted structure for cats includes a vertically disposed back surface attached directly to a vertical wall and/or a stud or a plurality of studs or attached to the vertical wall and/or the stud or the plurality of studs with a mounting bracket. A horizontally disposed floor forwardly extends from the back surface, wherein the floor is disposed perpendicular to the back surface and the floor is rectangular shaped. A horizontally disposed left side landing pad forwardly extends from the back surface, wherein the left side landing pad is disposed perpendicular to the back surface, and wherein the left side landing pad is disposed adjacent to a left side of the floor and at a height above the floor. A horizontally disposed right side landing pad forwardly extends from the back surface, wherein the right side landing pad is disposed perpendicular to the back surface, and wherein the right side landing pad is disposed adjacent to a right side of the floor and at a height above the floor. The left side landing pad and right side landing pad are oppositely disposed about a center of the wall mounted structure. A front surface is attached to the floor, the left side landing pad and the right side landing pad. A left side connecting wall forwardly extends from the back surface, wherein the left side connecting wall is attached to the back surface, the floor, the left side landing pad and the front surface. A right side connecting wall forwardly extends from the back surface, wherein the right side connecting wall is attached to the back surface, the floor, the right side connecting wall and the front surface. The left side connecting wall is disposed opposite from the right side connecting wall about the center of the wall mounted structure. The floor forms a bottom of a basin bounded around a floor perimeter by the back surface, the left side connecting wall, the front surface and the right side connecting wall.

In other exemplary embodiments, the front surface may be angled away from the back surface and the floor, wherein the front surface forms an obtuse angle with respect to the floor that is over 90 degrees and up to 150 degrees.

The front surface may include an aperture through the front surface, wherein the aperture is open at a top edge of the front surface and wherein aperture is at least 10 inches in aperture area.

The back surface, the floor, the left side landing pad, the right side landing pad, the front surface, the left side connecting wall and the right side connecting wall may be a single and continuous part formed in a molding process.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

An exemplary embodiment of a wall mounted structure 10 for cats is shown in FIGS. 1-4. The wall mounted structure 10 is a place that cats can climb into to get a more vertical perspective of their surroundings and generally feel comfortable and safe. In the wild, cats are not only predators but prey. Therefore, cats have a natural instinct to climb structures such as trees to keep them elevated above possible danger. The wall mounted structure 10 allows the cat to keep out of harm while also providing a safe and area for the cat to lounge and sleep. Also, the wall mounted structure 10 helps to keep cats off of other furniture.

The wall mounted structure 10 includes a vertically disposed back surface 12 attached directly to a vertical wall 14 and/or a stud 14 or a plurality of studs 14. There are holes 16 formed in the back surface 12 that allow fasteners to be placed there through. The fasteners can be screws, nails, drywall fasteners or any other suitable fastener known by those skilled in the art.

Figure 5:
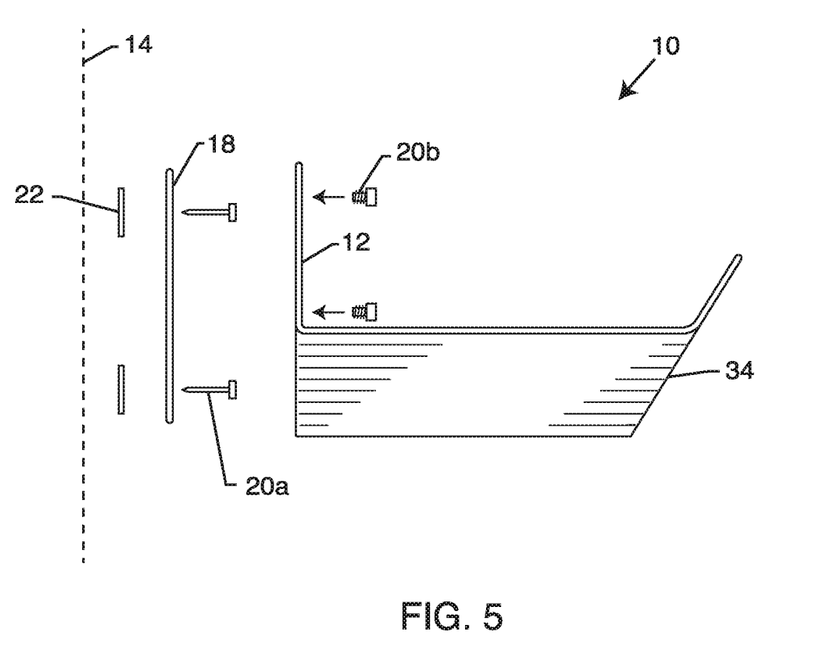
FIG. 5 is a side view similar to FIG. 3 now showing a mounting bracket.

Alternatively, the wall mounted structure 10 can be attached to the vertical wall 14 and/or the stud 14 or the plurality of studs 14 with a mounting bracket 18, as best shown in FIG. 5. The mounting bracket 18 can be attached to the wall with nails 20a. In this manner the mounting bracket 18 can be securely affixed to the studs of the wall. Then the wall mounted structure 10 can be attached with screws 20b to the mounting bracket 18. One skilled in the art will recognize that there are a multitude of ways and methods how the mounting bracket 18 or the wall mounted structure 10 can be affixed to the wall 14.

To help placement during installation, removable adhesive strips 22 could also be used to attach to either the mounting bracket 18 or the wall mounted structure 10. For example, the adhesive strips 22 could temporarily hold the mounting bracket 18 against the wall while one used the nails 20a or screws 20b to secure the mounting bracket permanently to the wall.

A horizontally disposed floor 24 forwardly extends from the back surface 12. The floor 24 is disposed perpendicular to the back surface 12. Optionally, the floor 24 may also include raised portions 26 that help add structural rigidity.

At least one horizontally disposed landing pad 28 forwardly extends from the back surface. In this embodiment, there is a left side landing pad 28a and a right side landing pad 28b. Optionally, the landing pads can include a textured surface 30. The cat is supposed to jump from and onto the landing pads 28. Therefore, having a good grip will aid in the cats usage. Therefore, the textured surface 30 may be a separate adhesive pad that is placed onto the landing pads 28 or the textured surface 30 could be formed into the landing pad during a molding process.

As can be seen, the at least one landing pad 28 is disposed perpendicular to the back surface 12. The at least one landing pad 28 is disposed adjacent to and at a height 32 above the floor. The height 32 may be at least 1 inch, 2 inches, 3 inches or even at least 4 inches.

A front surface 34 is attached to the floor 24 and the at least one landing pad 28.

A first (left side) connecting wall 36a may forwardly extend from the back surface, wherein the first connecting wall is attached to the back surface, the floor, the at least one landing pad and the front surface. A second (right side) connecting wall 36b may forwardly extend from the back surface, wherein the second connecting wall is attached to the back surface, the floor and the front surface. The second connecting wall 36b is disposed opposite from the first connecting wall 36a about a center 38 of the wall mounted structure.

The floor 24 may be rectangular shaped as shown herein. Furthermore, the floor may be at least 150 square inches in area. In another embodiment the floor is about 16 inches by 12 inches, which makes it about 192 inches in area.

The at least one landing pad 28 may also be rectangular shaped. The at least one landing pad 28 may be at least 30 square inches in area. In another embodiment the at least one landing pad is 5 inches by 14 inches, which makes it about 70 inches in area.

As can be seen, the floor may form a bottom of a basin bounded around a floor perimeter 40 by the back surface 12, the first connecting wall 36a, the front surface 34 and the second connecting wall 36b.

The front surface 34 may be angled away from the back surface and the floor, wherein the front surface 34 forms an obtuse angle 42 with respect to the floor that is over 90 degrees and up to 150 degrees. In one embodiment the obtuse angle could be about 135 degrees. In one embodiment the obtuse angle is over 100, 110, 120 or 130 degrees. The front surface 34 could be perpendicular to the floor 24, yet the obtuse angle 42 adds much in terms of design aesthetics and also creates a larger area for the cat to rest and lounge.

When a cat is inside the wall mounted structure, it may be hard for the cat to view outwardly or even for the owner to view into the wall mounted structure to see the cat inside. Therefore, the front surface 34 may include an aperture 44 through the front surface, wherein the aperture is open at a top edge 46 of the front surface and wherein aperture is at least 10 inches in aperture area. In another embodiment the aperture is about 25 inches in area. The aperture 44 allows the cat an opening to stick their head through and view downwardly. Cats feel more comfortable and secure when they are able to view their surroundings below.

The back surface, the floor, the at least one landing pad, the front surface, the first connecting wall and the second connecting wall may be a single and continuous part formed in a molding process. FIGS. 1-4 show a single and continuous part. Each surface blends into the next through a series of curvatures and bends. In this manner the whole wall mounted structure 10 is a single part.

Alternatively not shown, the back surface, the floor, the at least one landing pad, the front surface, the first connecting wall and the second connecting wall may be separate flat parts connected together to form the wall mounted structure 10. While this embodiment may not be as aesthetically pleasing, it may be cheaper to manufacture, at least initially. For example, a single mold that would create the entirety of the structure 10 could be very expensive. Therefore, to start production at a cheaper price a series of flat plates could be formed, cut or shaped that are then attached together using various brackets and fasteners. Whether the wall mounted structure 10 is formed as a single part or from separate parts it will have the general shape and appearance as taught and shown herein.

The wall mounted structure 10 is configured such that a separately formed plush pad or cushion may fit within the bottom of the basin of the floor. In this way the user is able to place a cushion for the cats to rest upon, as cats tend to prefer resting upon such similar cushions. The cushion may rest freely in the wall mounted structure or the cushion may be attached with fasteners, hook-and-loop type fasteners, buttons or the like.

To help packaging of the product, each wall mounted structure 10 may be configured to be nestable with regards to another wall mounted structure creating a stacking differential. This stacking differential may be of less than 3 inches, 2 inches or even 1 inch. The wall mounted structures are easily stackable because they have quite large draft angles. For instance, in the embodiment shown in FIGS. 1-4, the front surface 34 and each of the connecting walls 36 are angled outwardly forming obtuse angles. Therefore, a multitude of wall mounted structures can be stacked together. This is actually a good feature as each structure 10 is rather large. For example, the prototype structures 10 are about 30 inches by 15 inches by 7 inches.

Figure 1:
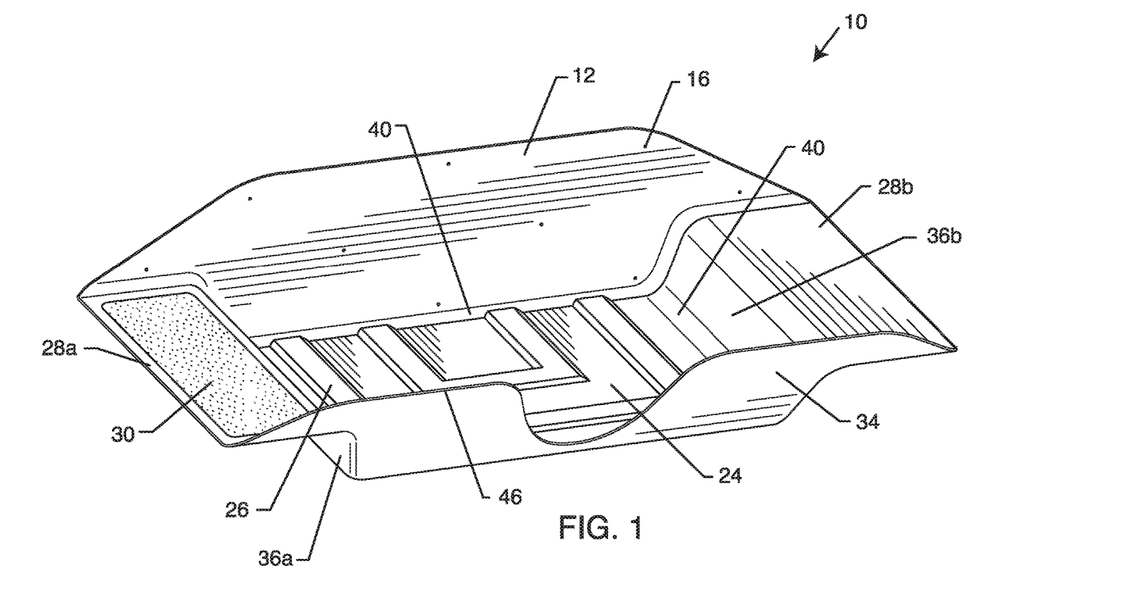
FIG. 1 is a front perspective view of an exemplary wall mounted structure for cats embodying the present invention.
Figure 2:
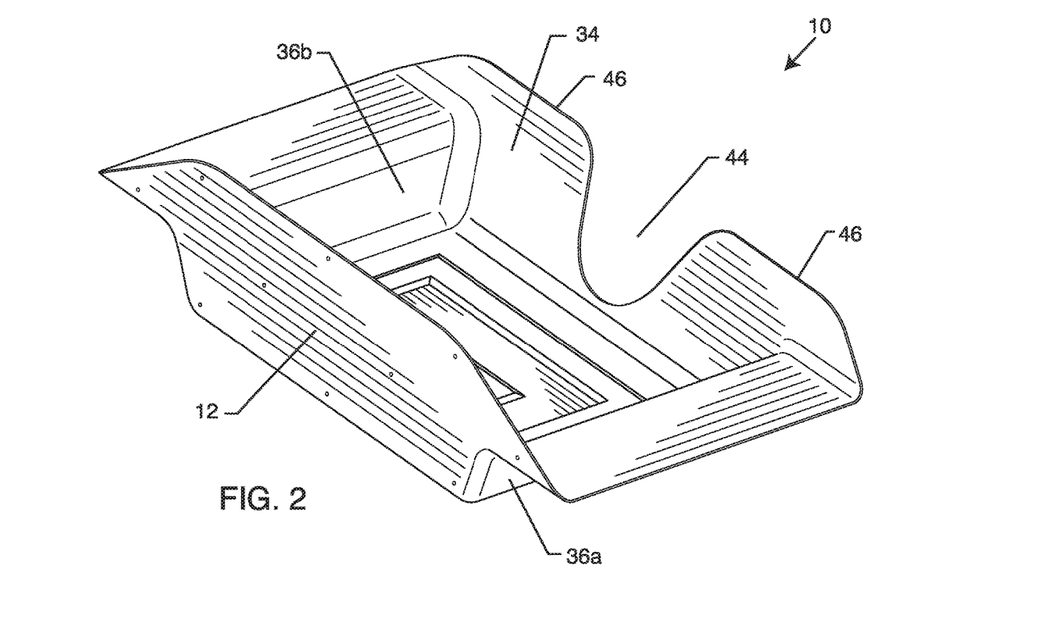
FIG. 2 is a rear perspective view of the structure of FIG. 1.
Figure 3:
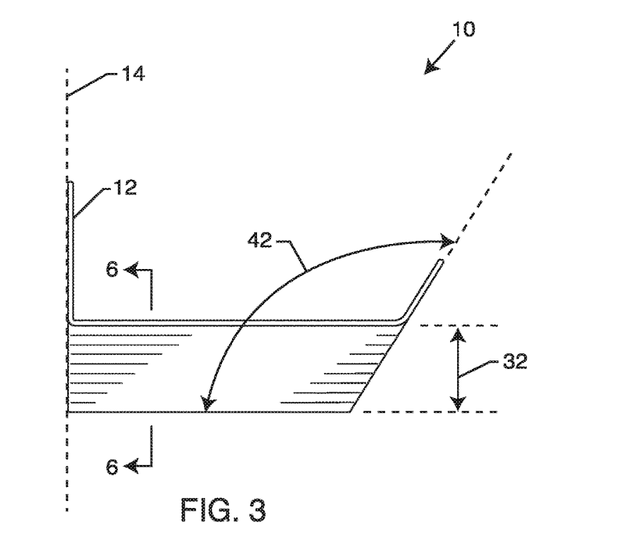
FIG. 3 is a side view of the structure of FIG. 1.
Figure 4:
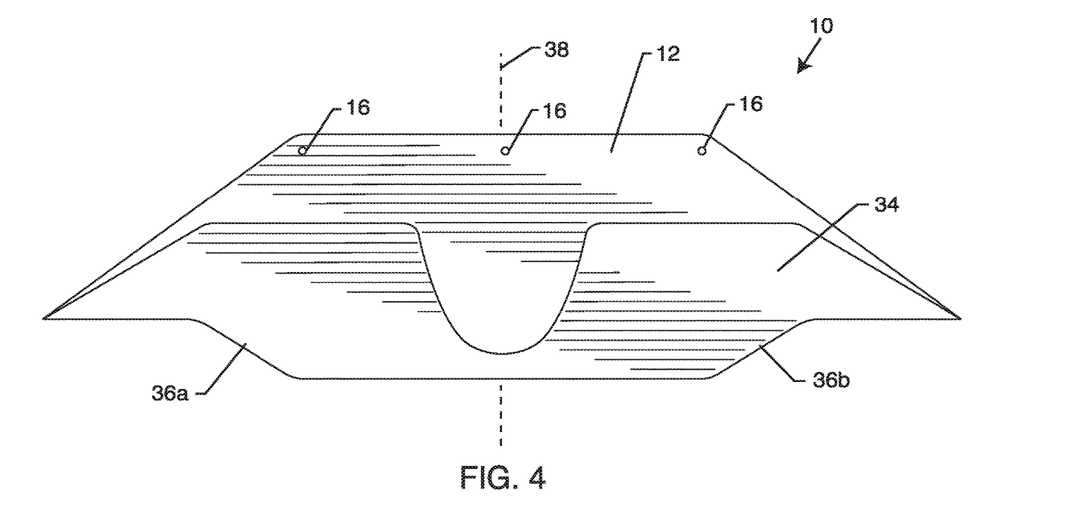
FIG. 4 is a front view of the structure of FIG. 1.

FIGS. 6A-6F are sectional views generally taken from FIG. 3 along lines 6-6. FIGS. 6A-6F show different embodiments of the wall mounted structure 10 and are not necessarily the structure of FIG. 3, except for FIG. 6D which is similar to the structure of FIG. 3.

Figure 6A:
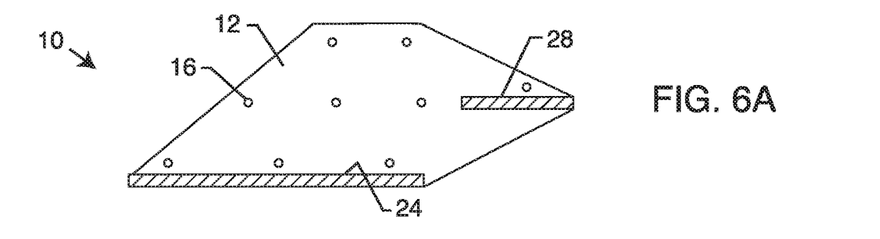
FIG. 6A is a sectional view taken generally along lines 6-6 from FIG. 3, now showing another embodiment of the present invention.

FIG. 6A shows a very simplistic embodiment where the floor 24 and the landing pad 28 are not connected. Also, only one landing pad is shown.

Figure 6B:
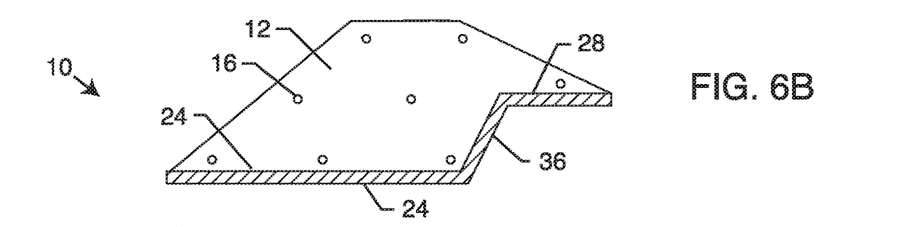
FIG. 6B is a sectional view taken generally along lines 6-6 from FIG. 3, now showing another embodiment of the present invention.

FIG. 6B is similar to FIG. 6A but now shows the connecting wall 36 which connects the floor 24 and the landing pad 28.

Figure 6C:
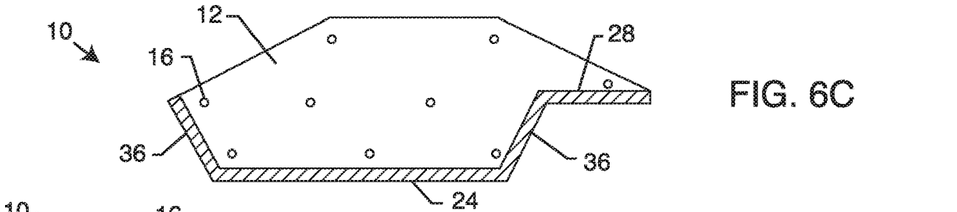
FIG. 6C is a sectional view taken generally along lines 6-6 from FIG. 3, now showing another embodiment of the present invention.

FIG. 6C is similar to FIG. 6B but now shows a second connecting wall 36 on the left hand side.

Figures 6D, 6E:
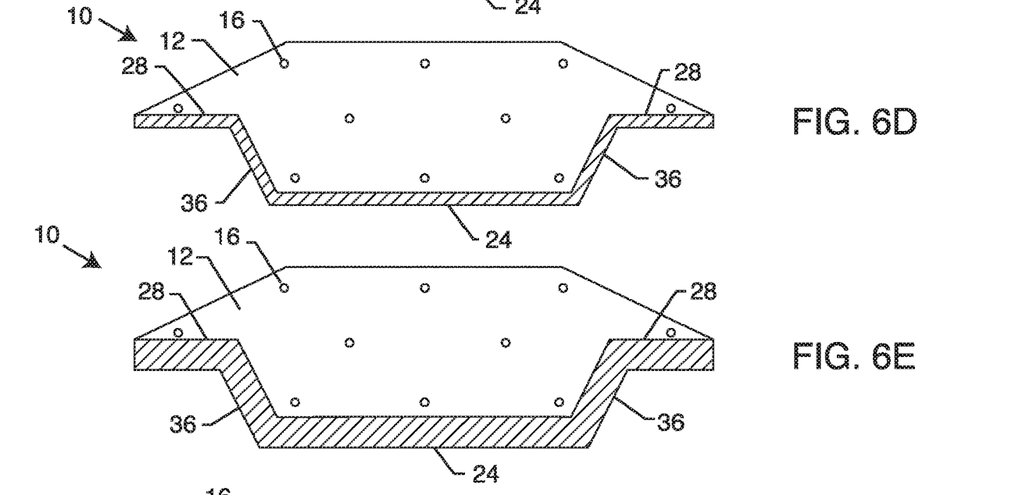
FIG. 6D is a sectional view taken generally along lines 6-6 from FIG. 3, now showing the structure of FIG. 3.
FIG. 6E is a sectional view taken generally along lines 6-6 from FIG. 3, now showing another embodiment of the present invention.

FIG. 6D is similar to FIG. 6C but now shows a second landing pad 28 opposite the first landing pad 28. Again, this structure is very similar to that shown in FIG. 3.

FIG. 6E is very similar to FIG. 6D but now the thickness of the material for the wall mounted structure 10 has been substantially increased. Using plastic would be too heavy, but the material could be a foam. Foam, such as EPS, EPP or some other moldable foam is light and can be very rigid. The foam may need a protective thin coating of plastic to protect it from wear and tear from the cats usage.

Figure 6F:
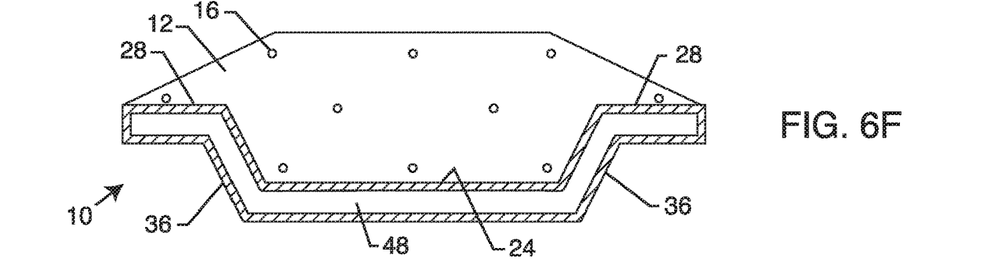
FIG. 6F is a sectional view taken generally along lines 6-6 from FIG. 3, now showing another embodiment of the present invention.
Figure 7:
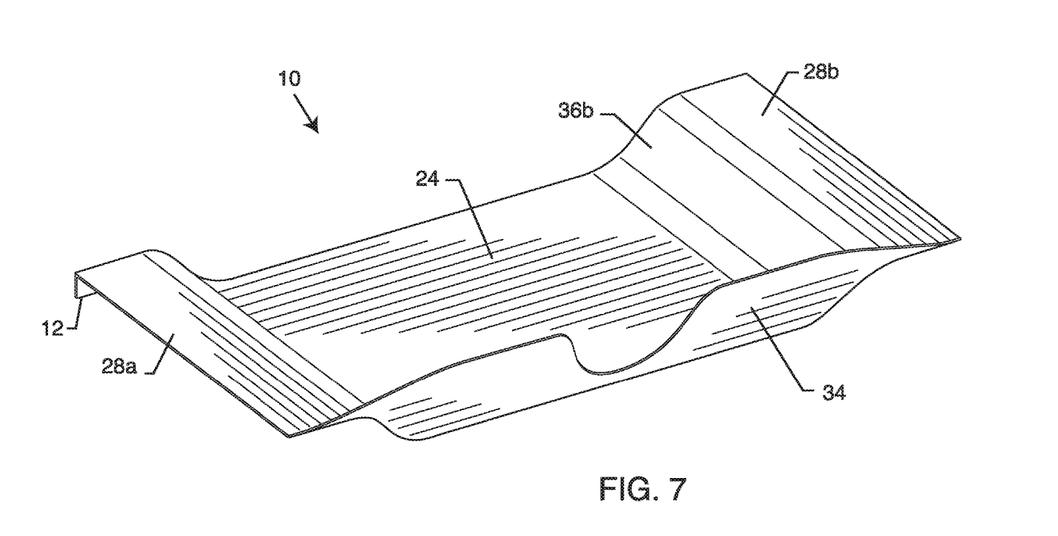
FIG. 7 is a front perspective view of another exemplary wall mounted structure for cats embodying the present invention.
Figure 8:
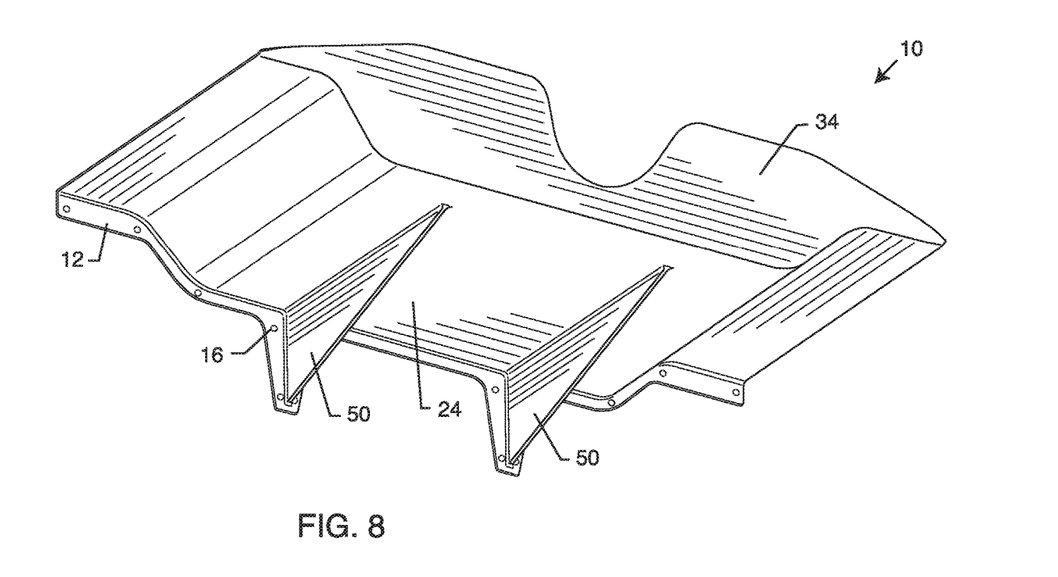
FIG. 8 is a rear perspective view of the structure of FIG. 7.
Figure 9:
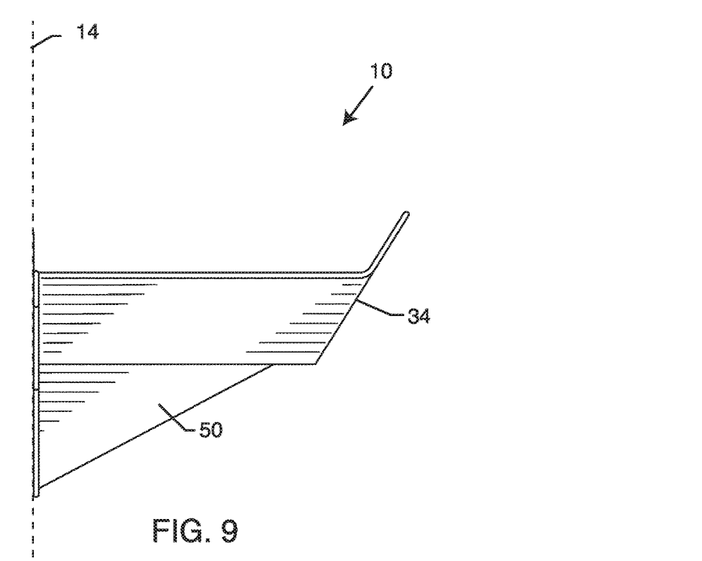
FIG. 9 is a side view of the structure of FIG. 7.
Figure 10:
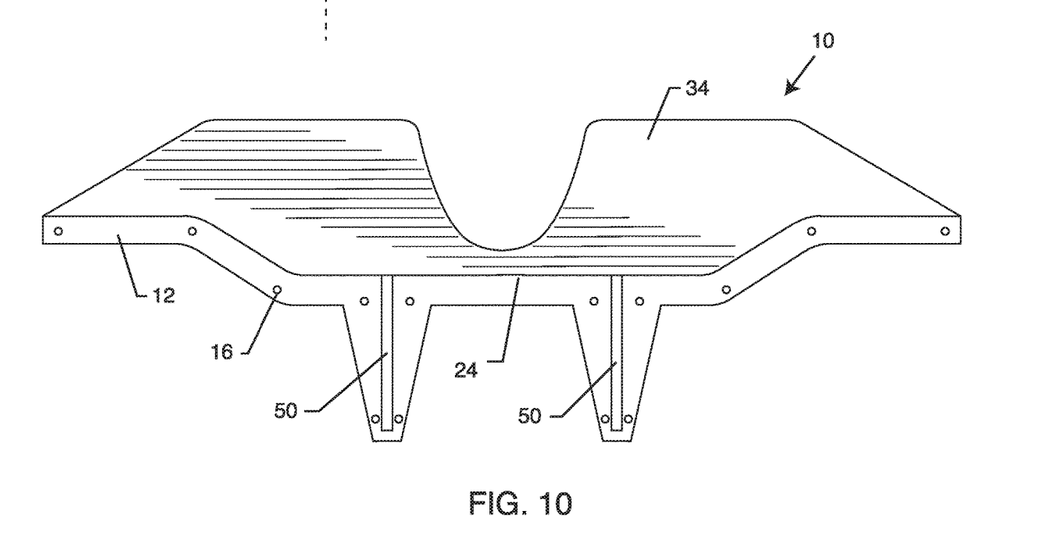
FIG. 10 is a front view of the structure of FIG. 7.
Figure 11:
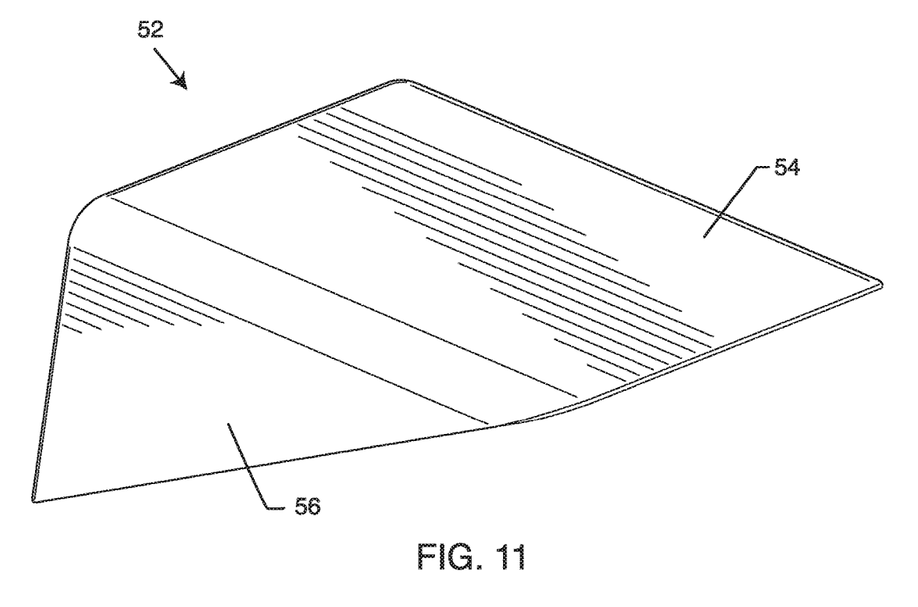
FIG. 11 is a front top perspective view of an exemplary wall mounted step of the present invention.
Figure 12:
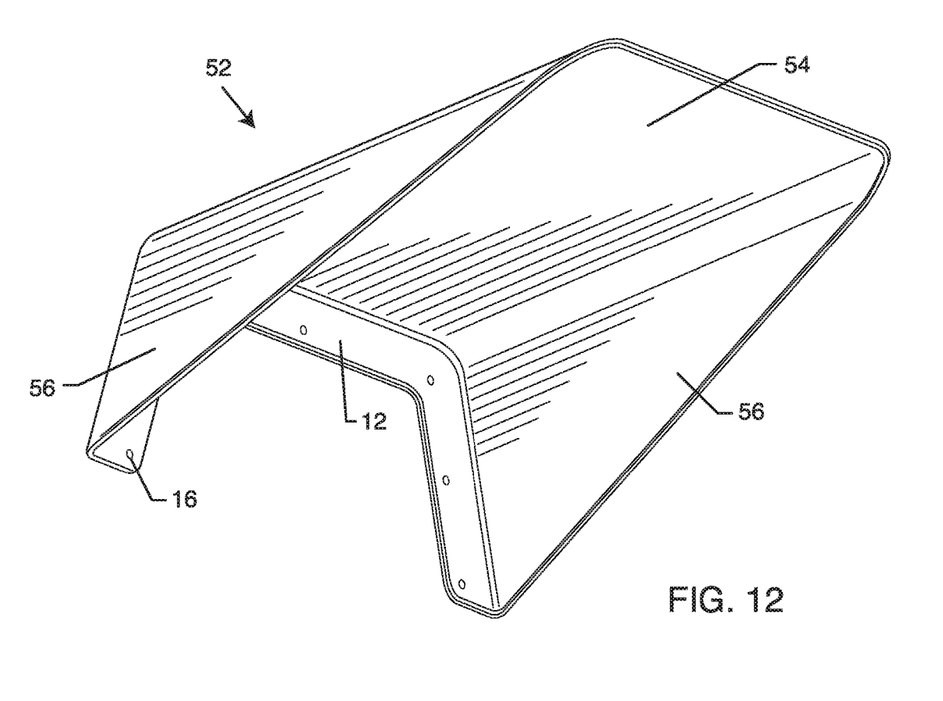
FIG. 12 is a front bottom perspective view of the structure of FIG. 11.
Figure 13:
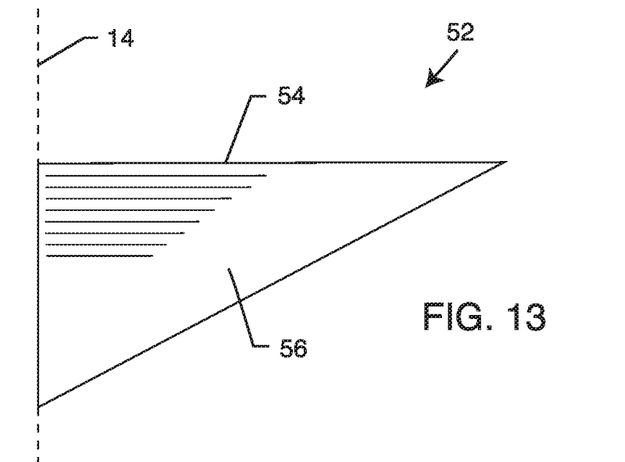
FIG. 13 is a side view of the structure of FIG. 11.
Figure 14:
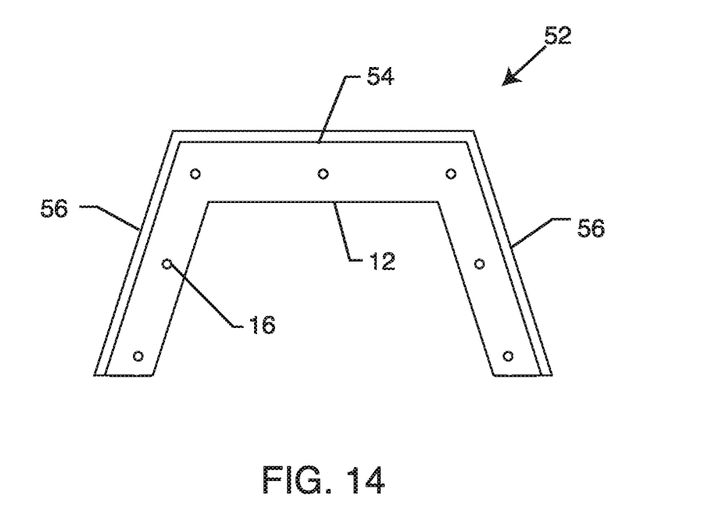
FIG. 14 is a front view of the structure of FIG. 11.

FIG. 6F is very similar to FIGS. 6D and 6E but now the material used is again a plastic material. There are rotatable molds that are capable of producing plastic parts with internal voids. In this embodiment the void 48 is empty space that is surrounded by the two plastic layers.

As can be seen in FIGS. 1-4, the at least one landing pad 28 is not be disposed directly above the floor 24, but rather is at the ends of the floor 24. Furthermore, in these embodiments of FIGS. 1-4 the wall mounted structure 10 has a back surface which may be at least 100 square inches in area. This is in contrast to another embodiment shown in FIGS. 7-10. FIGS. 7-10 show a different embodiment of the wall mounted structure 10 where now the back surface 12 is rather small in area. The back surface 12 doesn't extend upwardly, rather, the back surface 12 now extends downwardly along a relatively small edge. To add structural rigidity to this embodiment struts 50 may be needed. These struts 50 (i.e. braces, supports, angles) can be molded into the overall structure. Alternatively, these struts 50 could be separately manufactured and installed during assembly. As can be understood by those skilled in the art there are many variations and designs possible that encompass the teaching of this disclosure, as this disclosure is not to be limited to just the specific embodiments shown and taught herein.

Other separately manufactured parts may be included with the wall mounted structure 10 such that a kit or an assembly is formed. For example, FIGS. 11-14 show a separately formed step 52 that may be attachable to the vertical wall 14 and/or the stud 14 or the plurality of studs 14. The step 52 also has a floor 54 and struts 56 that provide rigidity. The step 52 includes holes 16 that may be used to attach it to the wall 14 or could even use adhesive strips 22 as previously discussed.

As is understood, a plurality of steps 52 may be used to create a staircase that leads to the wall mounted structure 10. By utilizing a plurality of steps 52, the wall mounted structure 10 can be positioned quite higher than a cat would normally be able to reach without the use of the steps 52.

The plurality of steps 52 are also formed such that they too are stackable in a very compact manner. This would also aid in storage and shipping as even the steps 52 can become large if not stacked.

Figure 15:
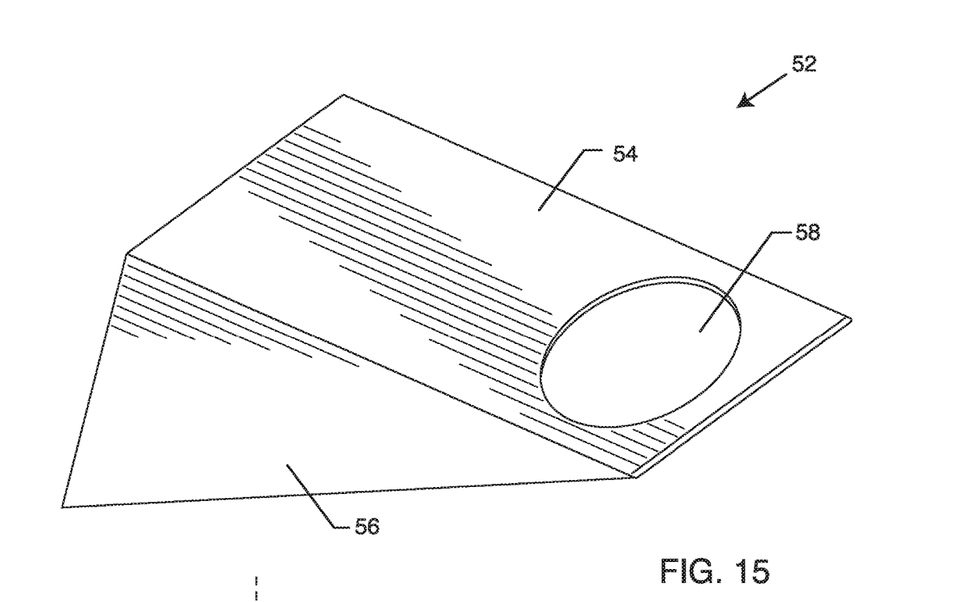
FIG. 15 is a front perspective view of an exemplary wall mounted step of the present invention now including a hole for a feeding bowl.

FIG. 15 shows a separately formed step 52 that now includes a hole 58 such that a food bowl can be placed within. This design would aid in feeding cats separately as each step 52 is sized to only support one cat at a time.

Figure 16:
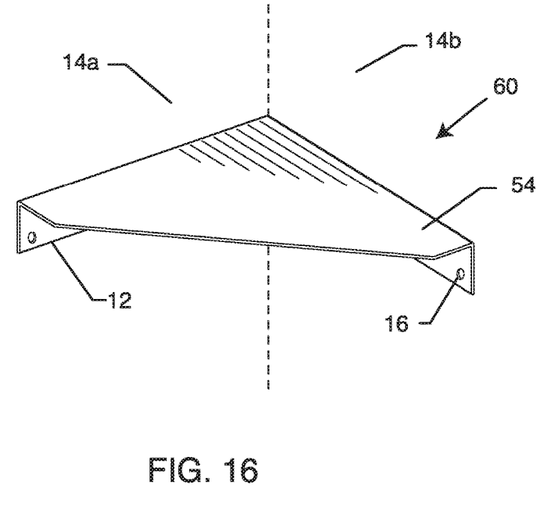
FIG. 16 is a front perspective view of an exemplary wall mounted corner step of the present invention.

FIG. 16 is a corner step 60 that can be placed into a corner of two walls 14a and 14b.

Figure 17:
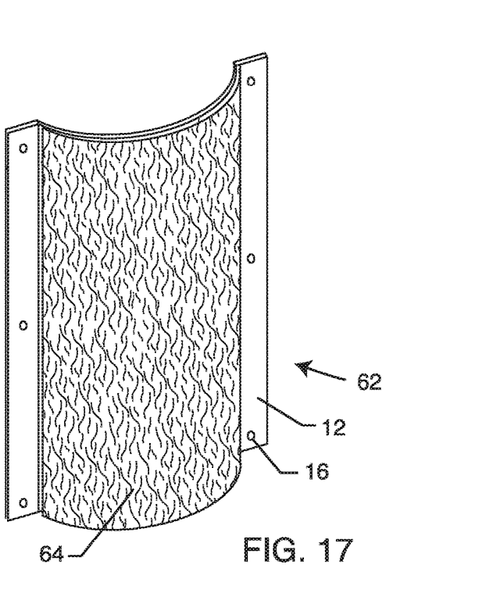
FIG. 17 is a front perspective view of an exemplary wall mounted vertical wall element of the present invention including a carpeted pad for gripping by the cat.

FIG. 17 is also a separately formed vertical wall element 62 with a gripping surface 64 which may be attachable to the vertical wall 14 and/or the stud 14 or the plurality of studs 14. The gripping surface 64 comprises a carpet or plush surface climbable by the cats. The gripping surface 64 may be adhered to the wall element 62 or fastened on with various fastening means known to those skilled in the art.

In the embodiments shown herein the material used for the wall mounted structure 10 is a polymer. It will be understood that other materials could be used such as composites, woods and/or metals. However, a mold can be made and a multitude of polymer parts produced relatively cheaply once the mold has been manufactured. To help to add stiffness to the wall mounted structure 10, a stiff polymer should be selected. Furthermore, additives such as glass fills can also be used to increase stiffness. For example, an ABS or polycarbonate polymer can be used where it is filled with either 10%, 20%, 30% or 40% glass fill. The more glass, the stiffer the part. Furthermore, adding thickness would also generally increase the stiffness of the wall mounted structure.

Although several embodiments have been described in detail for purposes of illustration, various modifications may be made to each without departing from the scope and spirit of the invention. Accordingly, the invention is not to be limited, except as by the appended claims.

NUMERALS 10 wall mounted structure
12 back surface
14 wall or studs
16 holes
18 mounting bracket
20 fasteners
22 adhesive strip
24 floor
26 raised portions
28 landing pad
30 textured surface
32 height
34 front surface
36 connecting wall
38 center
40 perimeter
42 obtuse angle
44 aperture
46 top edge of front surface
48 void
50 struts
52 step
54 floor, step
56 struts, step
58 hole, food bowl
60 corner step
62 vertical wall element
64 gripping surface

What is claimed is:

1. A wall mounted structure for cats, comprising:
a vertically disposed back surface configured to be attached directly to a vertical wall and/or a stud or a plurality of studs or attached to the vertical wall and/or the stud or the plurality of studs with a mounting bracket;
a horizontally disposed rigid floor attached to and forwardly extending from the back surface, wherein the floor is disposed perpendicular to the back surface;
at least one horizontally disposed landing pad forwardly extending from the back surface, wherein the at least one landing pad is disposed perpendicular to the back surface, and wherein the at least one landing pad is disposed fully outwardly adjacent to the floor in a horizontal direction and at a height above the floor; and
a front surface attached to the floor and the at least one landing pad;
wherein the back surface, the floor, the landing pad and the front surface are made of the same material;
wherein the back surface is not disposed below the floor.

2. The wall mounted structure of claim 1, including a first connecting wall forwardly extending from the back surface, wherein the first connecting wall is attached to the back surface, the floor, the at least one landing pad and the front surface.

3. The wall mounted structure of claim 2, wherein the floor is rectangular shaped.

4. The wall mounted structure of claim 3, wherein the floor is at least 150 square inches in area.

5. The wall mounted structure of claim 4, wherein the at least one landing pad is rectangular shaped.

6. The wall mounted structure of claim 5, including a second connecting wall forwardly extending from the back surface, wherein the second connecting wall is attached to the back surface, the floor and the front surface, wherein the second connecting wall is disposed opposite from the first connecting wall about a center of the wall mounted structure.

7. The wall mounted structure of claim 6, wherein the floor forms a bottom of a basin bounded around a floor perimeter by the back surface, the first connecting wall, the front surface and the second connecting wall.

8. The wall mounted structure of claim 7, wherein the front surface is angled away from the back surface and the floor, wherein the front surface forms an obtuse angle with respect to the floor that is over 90 degrees and up to 150 degrees.

9. The wall mounted structure of claim 8, wherein the front surface includes an aperture through the front surface, wherein the aperture is open at a top edge of the front surface and wherein aperture is at least 10 inches in aperture area.

10. The wall mounted structure of claim 9, wherein the back surface, the floor, the at least one landing pad, the front surface, the first connecting wall and the second connecting wall are a single and continuous part formed in a molding process.

11. The wall mounted structure of claim 9, wherein the back surface, the floor, the at least one landing pad, the front surface, the first connecting wall and the second connecting wall are separate flat parts connected together to form the wall mounted structure.

12. The wall mounted structure of claim 9, wherein the at least one landing pad comprises a textured surface.

13. The wall mounted structure of claim 9, wherein the wall mounted structure is configured to be nestable with regards to a second wall mounted structure creating a stacking differential of less than 3 inches, wherein the second wall mounted structure is the exact same as the wall mounted structure.

14. The wall mounted structure of claim 9, wherein the at least one landing pad is not disposed directly above the floor.

15. The wall mounted structure of claim 9, wherein the back surface is at least 100 square inches in area.

16. The wall mounted structure of claim 9, including at least one separately formed step attachable to the vertical wall and/or the stud or the plurality of studs, the wall mounted structure and the step forming a plurality of structures comprising an assembly, wherein the wall mounted structure and the step are configured to be used in cooperation with each other.

17. The wall mounted structure of claim 9, including at least one separately formed corner step attachable to a corner of the vertical wall, the wall mounted structure and the corner step forming a plurality of structures comprising an assembly, wherein the wall mounted structure and the corner step are configured to be used in cooperation with each other.

18. The wall mounted structure of claim 9, including at least one separately formed vertical gripping surface attachable to the vertical wall and/or the stud or the plurality of studs, wherein the vertical gripping surface comprises a carpet or plush surface climbable by the cats, the wall mounted structure and the vertical gripping surface forming a plurality of structures comprising an assembly, wherein the wall mounted structure and the vertical gripping surface are configured to be used in cooperation with each other.

19. The wall mounted structure of claim 5, wherein the at least one landing pad is at least 30 square inches in area.

20. A wall mounted structure for cats, comprising:
a vertically disposed back surface configured to be attached directly to a vertical wall and/or a stud or a plurality of studs or attached to the vertical wall and/or the stud or the plurality of studs with a mounting bracket;
a horizontally disposed rigid floor forwardly attached to and extending from the back surface, wherein the floor is disposed perpendicular to the back surface and the floor is rectangular shaped;
a horizontally disposed left side landing pad connected to and forwardly extending from the back surface, wherein the left side landing pad is disposed perpendicular to the back surface, and wherein the left side landing pad is disposed fully outwardly adjacent to a left side of the floor in a horizontal direction and at a height above the floor;
a horizontally disposed right side landing pad forwardly extending from the back surface, wherein the right side landing pad is disposed perpendicular to the back surface, and wherein the right side landing pad is disposed fully outwardly adjacent to a right side of the floor in the horizontal direction and at a height above the floor;
wherein the left side landing pad and right side landing pad are oppositely disposed about a center of the wall mounted structure;
a front surface attached to the floor, the left side landing pad and the right side landing pad;
a left side connecting wall forwardly extending from the back surface, wherein the left side connecting wall is attached to the back surface, the floor, the left side landing pad and the front surface;
a right side connecting wall forwardly extending from the back surface, wherein the right side connecting wall is attached to the back surface, the floor, the right side connecting wall and the front surface;
wherein the left side connecting wall is disposed opposite from the right side connecting wall about the center of the wall mounted structure; and
wherein the back surface is not disposed below the floor, wherein the floor forms a bottom of a basin bounded around a floor perimeter by the back surface, the left side connecting wall, the front surface and the right side connecting wall;
wherein the back surface, the floor, the left side landing pad, the right side landing pad, the left side connecting wall, the right side connecting wall and the front surface are made of the same material.

21. The wall mounted structure of claim 20, wherein the front surface is angled away from the back surface and the floor, wherein the front surface forms an obtuse angle with respect to the floor that is over 90 degrees and up to 150 degrees.

22. The wall mounted structure of claim 21, wherein the front surface includes an aperture through the front surface, wherein the aperture is open at a top edge of the front surface and wherein aperture is at least 10 inches in aperture area.

23. The wall mounted structure of claim 22, wherein the back surface, the floor, the left side landing pad, the right side landing pad, the front surface, the left side connecting wall and the right side connecting wall are a single and continuous part formed in a molding process.

24. A wall mounted structure for cats, comprising:
a vertically disposed back surface attached directly to a vertical wall and/or a stud or a plurality of studs or attached to the vertical wall and/or the stud or the plurality of studs with a mounting bracket;
a horizontally disposed rigid floor attached to and forwardly extending from the back surface, wherein the floor is disposed perpendicular to the back surface;
at least one horizontally disposed landing pad attached to and forwardly extending from the back surface, wherein the at least one landing pad is disposed perpendicular to the back surface, and wherein the at least one landing pad is disposed fully outwardly adjacent to the floor in a horizontal direction and at a height above the floor; and
a front surface attached to the floor and the at least one landing pad;
wherein the front surface is angled away from the back surface and the floor, wherein the front surface forms an obtuse angle with respect to the floor that is over 90 degrees and up to 150 degrees;
wherein the back surface, the floor, the landing pad and the front surface are made of the same material; and
wherein the back surface is not disposed below the floor.

25. A wall mounted structure for cats, comprising:
a vertically disposed back surface attached directly to a vertical wall and/or a stud or a plurality of studs or attached to the vertical wall and/or the stud or the plurality of studs with a mounting bracket;
a horizontally disposed rigid floor attached to and forwardly extending from the back surface, wherein the floor is disposed perpendicular to the back surface;
at least one horizontally disposed landing pad forwardly extending from the back surface, wherein the at least one landing pad is disposed perpendicular to the back surface, and wherein the at least one landing pad is disposed fully outwardly adjacent to the floor in a horizontal direction and at a height above the floor;

a front surface attached to the floor and the at least one landing pad;

wherein the front surface includes an aperture through the front surface, wherein the aperture is open at a top edge of the front surface and wherein aperture is at least 10 inches in aperture area; and wherein the back surface is not disposed below the floor.

* * * * *